July 8, 1969 — F. C. KRUMHOLZ — 3,454,103
PLANTER MARKER
Filed Dec. 2, 1966 — Sheet 1 of 3

Inventor
Frank C. Krumholz
By Kenneth———
Attorney

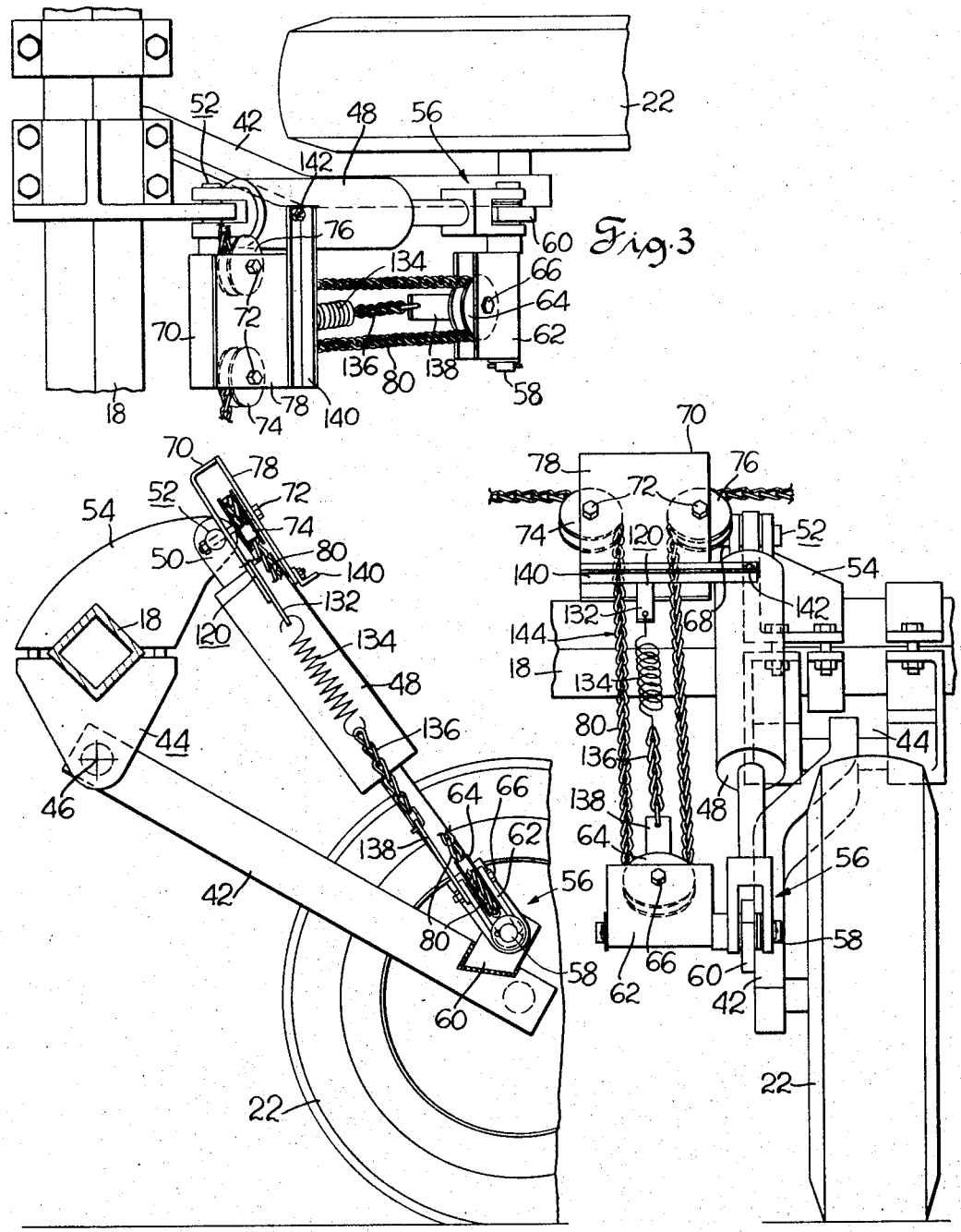

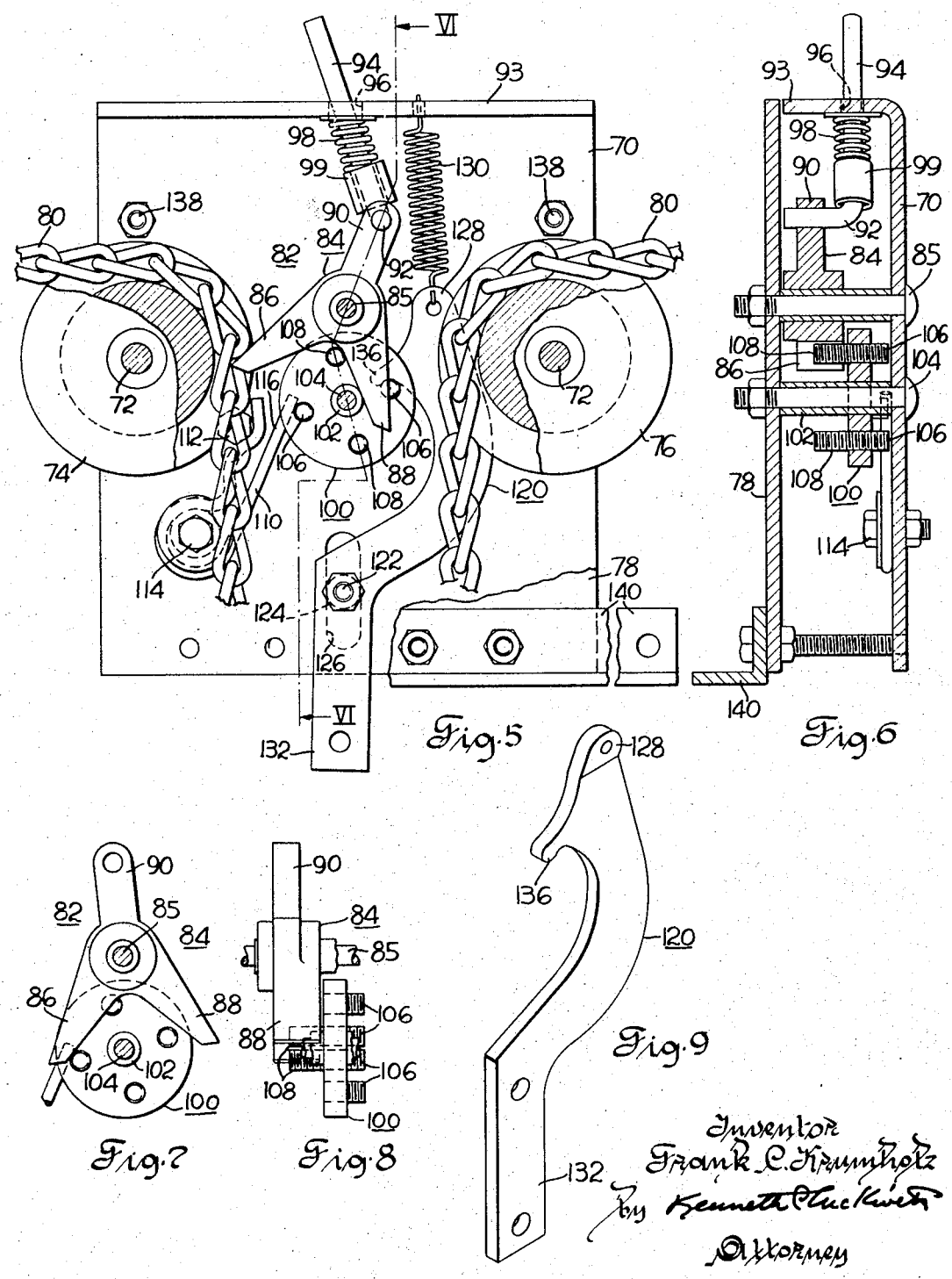

United States Patent Office 3,454,103
Patented July 8, 1969

3,454,103
PLANTER MARKER
Frank C. Krumholz, Hales Corners, Wis., assignor to Allis-Chalmers Manufacturing Company, Milwaukee, Wis.
Filed Dec. 2, 1966, Ser. No. 598,697
Int. Cl. A01b 29/06, 33/16
U.S. Cl. 172—128                             3 Claims

ABSTRACT OF THE DISCLOSURE

This invention is concerned with marking devices mounted on the two sides of a planter and which markers are alternately used, such markers being raised in response to raising the planter from operative position and such markers being sequenced so that the marker in operation before the planter is raised will not be the marker in operation when the planter is lowered, the improvement of being able to raise the planter to less than its maximum height without triggering the sequence mechanism.

---

Figure 1:
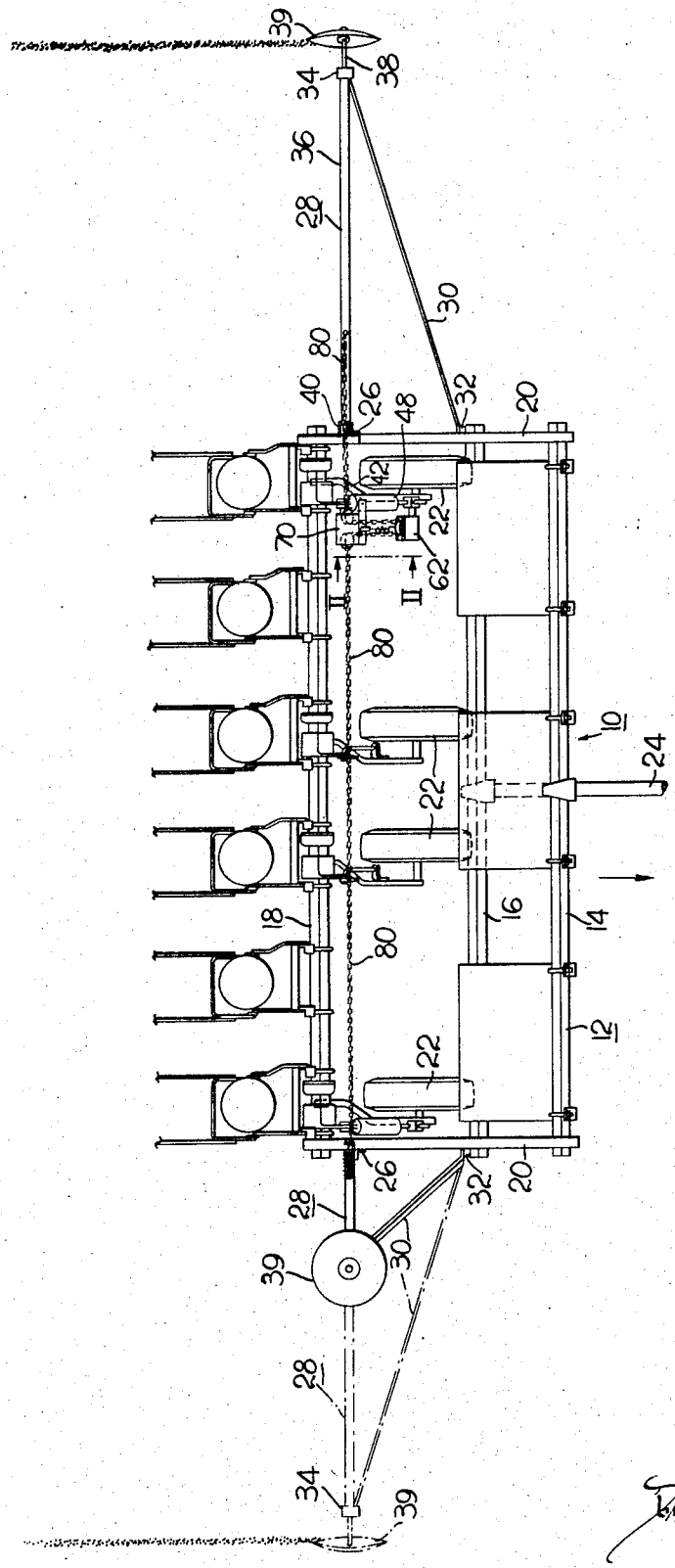

This invention relates to row markers for farm implements and more particularly to a planter having oppositely directed arms automatically and alternately movable to and from an operative position upon elevation and lowering of a planter or cultivator.

Agricultural implements utilizing markers generally provide a marker arm at each side of the implement to be alternately placed in operation, the inactive marker being held in a transport or raised position while the other marker is operating. In the past, implements of this type have been constructed in which the lifting and lowering of the markers is automatically controlled by the raising and lowering of the implement. However, when operating such an implement over grassed waterways or the like, it is sometimes desirable to be able to raise and lower the implement without having the markers reversed otherwise the implement has to be cycled or lifted twice to return the same marker arm to its operating position.

It is the principal feature of this invention to provide automatic marker reversing mechanism inoperative until the extreme end of movement to raise the planter to its transport position is obtained and thus permitting the planter to be raised far enough so that the planting units are out of contact with the ground and then enabling the planter to be returned to its lowered operating position without activating the automatic marker reversing mechanism.

In the past marker control mechanism has been provided in which latch means is associated with each marker arm and acts to hold both markers in an elevated position, with the latches alternately and automatically being released by successive operation of the raising and lowering means. This actuation of the marker latches by a control mechanism separate from the marker lift-lower mechanism resulted in excessive structure, a complicated mechanism that was difficult to service and one that was expensive to manufacture.

It is also a feature of the subject invention to provide a simple and practical marker lift mechanism which is operated by the planter lift and which includes a compact automatic latch control mechanism cooperating with and directly activated by the planter lift mechanism.

These and other objects of this invention will be apparent upon reference to the following description and claims taken in conjunction with the accompanying drawings wherein:

FIG. 1 is a plan of a six row planter embodying the invention;

FIG. 2 is an enlarged view of a portion of the planter taken on line II—II of FIG. 1;
FIG. 3 is a plan view of the portion shown in FIG. 2;
FIG. 4 is a front elevation of the portion of the planter shown in FIG. 2;
FIG. 5 is an enlarged plan view of the latch mechanism with some parts removed for clarity of illustration;
FIG. 6 is a view taken on line VI—VI of FIG. 5;
FIG. 7 is a detail similar to FIG. 5 with additional parts removed for clarity of illustration;
FIG. 8 is a side elevation of the detail shown in FIG. 7; and,
FIG. 9 is a perspective view of the actuating member for the latch shown in FIG. 5.

Referring now to the drawings in detail, particularly to FIG. 1, the reference numeral 10 refers to the planter as a whole including a generally rectangular main frame 12 that is made up of transverse tool bars 14, 16 and 18 and end channels 20. The planter frame 12 is supported by ground wheels 22 and includes a forwardly extending hitch or draft bar 24 carried by tool bars 14 and 16 of the planter 10.

A marker arm support 26 is fixed to each rear corner of the planter frame 12 and the lower end of each support 26 pivotally mounts a marker arm 28 for movement about a longitudinal axis. Both marker arms are substantially the same, excepting for being right or left, therefore a description of one of the arms should suffice. Marker arm 28 is additionally supported by a diagonal brace 30 which has its inner end pivotally mounted to the planter frame channel 20 by means of a bracket 32 and its outer end secured to the marker arm 28 by a clamp member 34. The marker arm 28 is longitudinally adjustable being constructed of two sections 36 and 38 arranged in telescopic relation. The inboard section 36 is provided with suitable clamps (not shown) by which the outboard section 38 is adjustably secured therewith. Ground engaging marking elements such as disks 39 are rotatably mounted to the outer end of marker arm 28 in a conventional manner. The upper end of marker arm support 26 rotatably mounts a sheave 40.

Planter 10 is equipped with a power lift including a wheel arm 42 (see FIG. 4) pivotally connected to a mounting bracket 44 which is secured to the planter frame rear tool bar 18 by conventional means. The wheel arm 42 is actuated about its pivot axis 46 by means of a hydraulic ram 48. The base portion 50 of the ram 48 is pivotally mounted on a pin 52 located in the upper portion 54 of the mounting bracket 44. The rod end 56 of the ram 48 is pivotally connected to the wheel arm 42 by means of a pin 58 carried on a bracket 60 extending from arm 42. The pin 58 extends laterally outward from the rod end 56 of the ram 48 and pivotally mounts a bracket 62 which supports a single sheave 64 rotatable about the axis of bolt 66 carried by bracket 62. Upper pin 52 extends laterally outward from mounting bracket 44 with its outer portion 68 rigidly mounting a center plate 70 by means of bolts 72. A pair of transversely spaced sheaves 74 and 76 are rotatably mounted on bolts 72 with the same bolts also securing a cover plate 78 to the center plate 70.

A feature of the present device is the ability to raise the marker arms 28 into an inoperative transport position by utilizing the movement of the wheel arm 42 relative to the planter frame 12. Joining the marker arms 28 is a flexible line 80 shown as a chain. This chain is short enough so that only one marker arm at a time can be in its lowered operating position. When one marker is lowered the other must be in its raised inoperative position. It is by appropriately tensioning this chain and by slacking off a portion of it while clamping another portion that the marker arms are automatically operated. Chain 80 is led over guide sheaves 74 and 76 with the portion of the chain running between guide sheaves being trained over central sheave 64 which is movable bodily toward and away from guide sheaves 74 and 76.

To apply tension to the chain 80 and thus draw a bight in its central portion to place the marker arms 28 in their raised transport position, the central sheave 64 is moved downward by the extension of hydraulic ram 48.

Referring to FIGS. 5, 6 and 7, mechanism is provided so that one of the marker arms can be held in a raised position by latch means indicated generally by reference numeral 82. The latch means includes a dual latching member 84 pivotally mounted on pivot bolt 85 and having two detents 86 and 22 swingable to selectively engage the chain 80. Pivot bolt 85 is carried by center plate 70 and cover 78. Member 84 includes a tail section 90 that is apertured to pivotally receive a bent portion 92 of an upwardly extending rod 94 which is slidably received in an opening 96 in the upwardly bent forward end of center plate 70. A spring 98 is mounted about rod 94 and is confined between an abutment 99 on the rod and the turned over portion 93 of plate 70. Thus, when the latching member 84 is shifted from one position to the other, it releases the chain portion that extends to one marker arm and locks the other chain portion by acting against the chain and against the associated sheave 74 or 76.

An indexing cam 100 is rotatably mounted between the center plate 70 and cover 78 by means of bushing 102 and bolt 104. The cam 100 is positioned below the latching member 84 and is provided with downwardly projecting pins 106 (when viewed in FIG. 5) spaced 90° apart with every other one of the pins as at 108 projecting upwardly above the cam to engage either detent 86 or 88 of the latching member 84. A one way stop in the form of hair pin spring 110 is mounted on the center plate 70 by means of bolts 112 and 114. The free end portion 116 of this one way stop 110 extends into the rotational path of the cam pins 106 so that the terminal end of the stop 110 will act as an abutment to prevent counterclockwise movement of the cam 100. However, the stop 110 will deflect outwardly thereby permitting clockwise movement of the cam 100 to activate the latching member 84.

A cam actuating arm 120 is mounted on the center plate 70 for limited longitudinal movement by means of a bolt 122 provided with a bushing 124 which is received in a slot 126 in the center plate 70. The upper end 128 of the arm 120 is apertured to receive one end of a spring 130 which has its other end anchored to turned over portion 93. The lower end 132 of the arm 120 is connected to bolt 66, which is the same bolt that mounts central sheave 64, by means of a tension spring 134, chain 136, and link 138. The effective length of the chain 136 is adjustable to vary the amount of spring tension on the arm 120 when the ram 48 extends to raise the planter. The cam actuating arm 120 is also provided with a hook portion 136 which extends inwardly to engage the lower pins 106 of the index cam 100. It should be understood that the arm 120 can move longitudinally within the confines of slot 126 and also pivot about the axis of bolt 122 to allow the hook portion 136 to move laterally around the pin 106 being engaged, thereby returning the hook portion 136 to its normal position by the action of spring 130. Bolts 138 are secured to the center plate 70 and prevent the chain 80 from riding out of the sheaves 74 and 76. The lower portion of the center plate cover 78 is provided with an angle member 140 which is rigidly secured to the cover by conventional means and such angle member extends laterally beyond the cover to overlie hydraulic ram 48. An adjustable abutment in the form of a bolt 142 carried by the angle member contacts the ram cylinder 48 to keep the center plate 70 and associated sheaves 74 and 76 in alignment with the lower central sheave 64.

From the foregoing description, it will be seen that whenever hydraulic ram 48 is actuated to swing wheel arm 42 downwardly, the central sheave 64 is moved away from the guide sheaves 74 and 76, which elongates the bight portion 144 of the chain 80, thus pulling upwardly against the lowered marker arm. When the wheel arm 42 is raised so as to lower the planter to operative position, the central sheave 64 is moved upwardly and the chain 80 loosened so as to free one or the other of the markers so that such free marker moves into lowered operative position. The spring 134 which exerts an indexing force on the actuating arm 120 when the planter is lifted, is adjustable so that cam 100 is rotated 90°, and actuates the latch member 84 at the very end of planter lift movement. This feature enables the operator to lift the planter just short of its maximum height and still lift the planting units clear of the ground without actuating the latch mechanism 84 to automatically reverse the marker arms. By basing the actuation of the latch mechanism on the amount of applied force rather than the displacement of parts, it was possible to achieve the necessary marker control for grassed waterways and the like without requiring a parallel actuating system as found in the prior art.

The operation of the invention is as follows: When the wheel arm 42 is powered downwardly to raise the planter, the downward movement of the central sheave 64 tensions spring 134 thereby exerting a force on cam actuating arm 120 to rotate cam 100 by means of hook portion 136 engaging one of the lower cam pins 106. Rotational movement of index cam 100 is resisted by return spring 130, over center latch spring 98 and the wedging actions of the detents 86 or 88 against the chain 80 and guide sheaves 74 or 76. When the extension of spring 134 is sufficient to overcome this resistance of cam movement, the hook portion 136 of the cam actuating arm 120 will rotate the cam 90° causing the inoperative upper cam pin 108 to contact the inoperative latch detent 86 or 88 to pivot the latch member 84 about the axis of bolt 85. The tail section 90 of the latch member 82 will then pass over center, causing the latch spring 98 to exert a reverse force acting about the pivot 85 to engage the chain 80 with the opposite detent. When the planter is lowered, the tension on spring 134 is reduced allowing the upper return spring 130 to move the arm 120 upwardly, its hook portion 136 being displaced laterally around the next lower cam pin 106 which has been pivoted into position by the previous lifting of the planter. Counterclockwise movement of the cam 100 is prevented by the stop member 110.

While in the foregoing a preferred embodiment of the invention has been disclosed, it should be understood that it is not intended to limit the invention to the details of construction herein shown and described.

I claim:

1. In combination in a farm implement including a frame, a wheel structure pivotally attached to said frame for supporting same, hydraulic means for raising said implement to inoperative position by lowering said wheel structure, row markers pivotally attached to opposite sides of said frame, a flexible member connecting said markers and being of a length permitting but one marker to be in marking position at a time, the improvement comprising flexible member length controlling means positioned adjacent the outer end of said wheel structure and adapted to take a bight in said flexible member and to increase the size of said bight in response to a lowering of said wheel structure, clamping means carried by said frame adjacent to said bight for alternately clamping a portion of said flexible member leading to one marker while releasing the portion leading to the other marker, said alternate clamping being triggered in response to said wheel structure being moved to the lowest position thereof and not being triggered by a movement less than maximum, said flexible member length controlling means comprises a central sheave carried by the outboard end of said wheel structure, said sheave being positioned to have a portion of said flexible member received therein, said sheave being positioned to provide a bight in a portion of said flexible member and to increase said bight in response to a lowering of said wheel structure.

2. The combination recited in claim 1 and wherein said clamping means is positioned opposite to said central sheave at the other end of said bight and comprises a pair of sheaves, said pair of sheaves having a portion of said flexible member trained about portions thereof, latch means positioned between said pair of sheaves and being positionable to clamp said flexible member against one of said pair of sheaves or the other, cam means for sequentially shifting said latch means from clamping on said bight to clamping another portion, a cam actuating member resiliently connected between said frame and the outboard end of said wheel structure, said actuating member being so constructed and arranged to actuate said cam in response to maximum downward movement by said wheel structure.

3. The combination as recited in claim 2 and wherein said flexible member is a chain and means carried by said frame are provided for preventing movement of said cam in one direction but permitting movement in the opposite direction.

References Cited
UNITED STATES PATENTS

| | | | |
|---|---|---|---|
| 2,604,027 | 7/1952 | Hansen | 172—128 |
| 2,956,629 | 10/1960 | Immesoete | 172—128 |
| 2,975,841 | 3/1961 | Oehler et al. | 172—128 |

ANTONIO F. GUIDA, *Primary Examiner.*

STEPHEN C. PELLEGRINO, *Assistant Examiner.*